United States Patent [19]

Shibata, deceased

[11] Patent Number: 4,527,875
[45] Date of Patent: Jul. 9, 1985

[54] ILLUMINATED FINDER

[75] Inventor: Shunichi Shibata, deceased, late of Tokyo, Japan, by Towa Shibata, legal representative

[73] Assignee: West Electric Company, Ltd., Osaka, Japan

[21] Appl. No.: 511,352

[22] Filed: Jul. 6, 1983

[30] Foreign Application Priority Data

Jul. 6, 1982 [JP] Japan .............................. 57-117208

[51] Int. Cl.³ .............................................. G03B 13/08
[52] U.S. Cl. .................................. 354/225; 354/289.1
[58] Field of Search ............... 354/199, 200, 201, 219, 354/224, 225, 289.1, 162, 163, 166, 402, 409, 471, 472

[56] References Cited

U.S. PATENT DOCUMENTS

| 4,051,503 | 9/1977 | Uno et al. ............... | 354/289.1 |
| 4,126,871 | 11/1978 | Tamura et al. ............. | 354/402 |
| 4,165,932 | 8/1979 | Asano et al. ............... | 354/225 |
| 4,372,657 | 2/1983 | Iwata et al. ............... | 354/471 |
| 4,396,263 | 8/1983 | Yamada ..................... | 354/471 |

FOREIGN PATENT DOCUMENTS 6606189  8/1970  Fed. Rep. of Germany.
279350  11/1951  Switzerland.

Primary Examiner—A. A. Mathews
Attorney, Agent, or Firm—Cushman, Darby & Cushman

[57] ABSTRACT

The present invention relates to an illuminated finder comprising illuminating windows through which light is entered for looking at an image of an object and a view frame, each window being disposed on an upper and front surface of a camera, and comprising a photographing information indicator being disposed on the upper surface of the camera, and comprising a transmitting window for detecting a distance, and therefore the photographing information and the view frame can be looked at easily from the outside of the camera and through an eye lens and a size of the illuminated finder can be compact.

3 Claims, 3 Drawing Figures

ILLUMINATED FINDER

BACKGROUND OF THE INVENTION

Field of the Invention

The present invention relates to an illuminated finder of a photographic camera, by which an object is viewed, especially relates to the illuminated finder of the photographic camera, having an illuminating window through which light is taken inside.

Hitherto, various kinds of cameras comprising the illuminated finder having the illuminating window are known. Especially, concerning a middle class camera of a lens-shutter type, which is called as a 35 mm conpact camera, many kinds of cameras are put into practical use.

A typical kind of the camera is illustrated in FIG. 1.

The finder shown in FIG. 1 comprises an object lens 1, a half reflection mirror 2, an eye lens 3, a frame sheet 4 having a transparent view frame 5 and a total reflection mirror 6'. The object which is not shown in FIG. 1 can be looked at by the light which reaches man's eye through the object lens 1, the half reflection mirror 2 and the eye lens 3 from the object. At the same time, the transparent view frame 5 made on the frame sheet 4 can be seen, overlapping the image of the object, by the light which reaches man's eye from the outside through, the frame sheet 4, the total reflection mirror 6', the half reflection mirror 2 and the eye lens 3.

That is, the light which reaches man's eye enters inside the camera from two illuminating windows 72, 73 which are made on a front surface 71 on which a main lens 8 of the camera 7 is mounted as shown by one-dot-chain line.

The above-mentioned illuminated finder of FIG. 1 has the problem that, when the light becomes faint, it is difficult to look at the image of the object and the view frame 5. That is, when the ambient light is faint, the light entering from a front of the camera 7, namely into the object lens 1 and the transparent sheet 4 through the illuminating windows 72, 73 from the object become faint. Especially, the conventional finder has a disadvantage that it is more difficult to look at the view frame 5 when a photograph is taken indoors than when the photograph is taken outdoors since the conventional view finder can not take sufficient light inside it.

Further, the conventional finder shown in FIG. 1 has another disadvantage in respect of the indication of photographing information. And when a liquid crystal display device is used for indicating other photographing informations in combination with the view frame 5, such a combination can be designed that the liquid crystal display device is disposed on an optical axis inside the camera 7, the axis being formed by the light incident from the illuminating window 73 of the camera 7. But the structure of the combination is very complicated from the viewpoint of production. Further, in other case, there is a user's desire to look at the photographing information of the liquid crystal display device not only through the view finder but also directly on the outside face of the camera. Accordingly, it is necessary to use two sets of liquid crystal display device or to use a particularly structured liquid crystal display device so as to be seen simultaneously through the finder and on the outside of the camera. But the constructions of such liquid crystal display devices are extremely complicated. Therefore, the conventional finder shown in FIG. 1 is not desirable from the view point of indicating of the photographying information.

Further, when a device for detecting a distance should be attached on the front face of above-mentioned camera, other disadvantage occurs. That is, for example, when an automatic focussing apparatus utilizing a triangulation method should be attached on the front face, the automatic focussing device having several parts $C_1$, $C_2$, $D_1$ and $D_2$, whatever they are active type or passive, are arranged inevitably in such disposition as on the front face as shown by broken lines in FIG. 1. Therefore these parts must be disposed on both sides on the illuminating windows 72, 73 on the front surface 71. Therefore, the conventional camera has such disadvantage that the size of the camera 7 is likely to become too large.

SUMMARY OF THE INVENTION

The present invention is intended to provide such an illuminated finder wherein the illuminating window for taken in ambient light for illuminating a frame, figures or marks, is disposed on an upper surface of the camera, thereby a light can be taken inside the finder from upper direction, which is different from the objective direction. Also the illuminating window is combined with an information indicator for indicating various photographing information. Therefore, the photographing information can be recognized easily from outside of the finder or camera body, besides in the finder eye lens.

The present invention is further intended to provide such an illuminated finder comprising an distance measuring window disposed on the front face and, distance measuring optical path means for leading light from the direction of the object into the finder, through the distance measuring window, and view frame illuminating optical path means for leading top light into the finder through an upper illuminating window, light path of said distance measuring optical path means being arranged to cross light path of said view frame illuminating optical path means in the finder, the distance measuring optical path means being for the distance detector for the triangulation method or the like optical distance detection method, thereby enabling miniaturizing the camera by integration of the distance measuring optical path means and the view frame illuminating optical path means.

DESCRIPTION OF THE PREFERRED EMBODIMENT

The illuminated finder of the present invention comprises:

(1) a first optical system for looking at an image of an object, comprising:
  a first window for taking in a first light from the direction of the object,
  a finder object lens for leading said first light inside through the first window,
  an eye lens disposed on a rear part of the camera and a half reflection mirror disposed in a first light path between said finder objective lens and said eye lens, (2) a second optical system which comprising:

a second window through which top light as a second light is taken inside, a frame sheet having a view frame, through which the second light passes, the second light entering inside through the second window, and a reflection mirror for leading the second light incident through the frame sheet to the eye lens in a second light path via the half reflection mirror, whereby the second optical system making the view frame overlapping on the image of the object at said half reflection mirror, (3) a photographing information indicator disposed on the second window at least a part of which covers at least a part of the second window.

Figure 2:
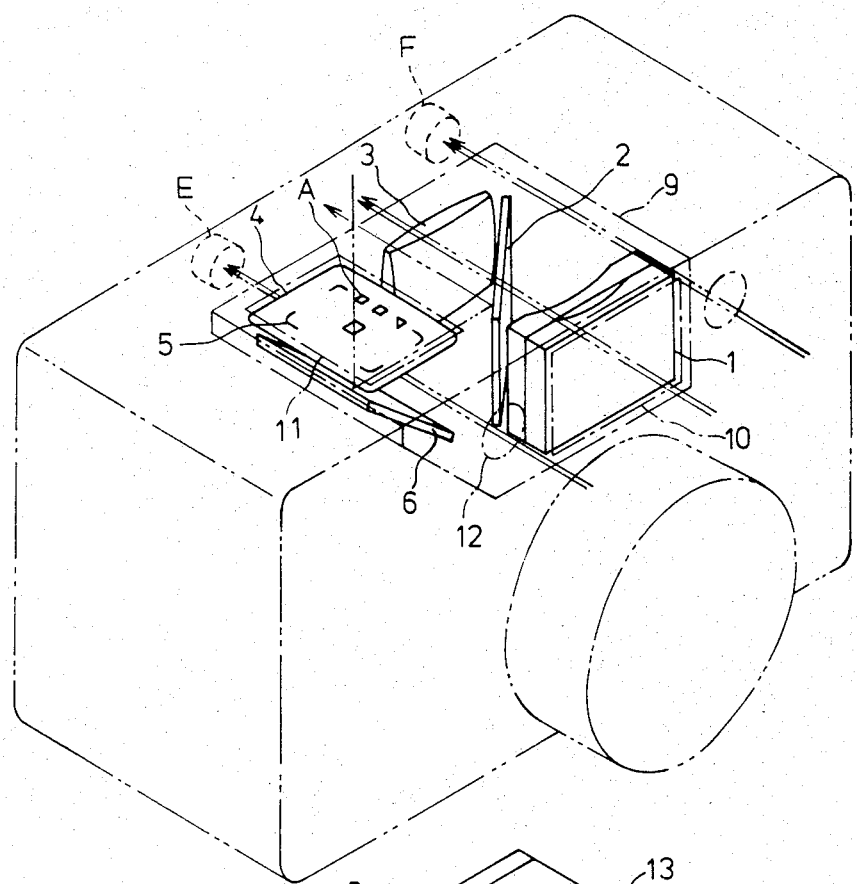
FIG. 2 is a perspective view showing an inside structure the illuminated finder of an embodiment of the present invention.
Figure 3:
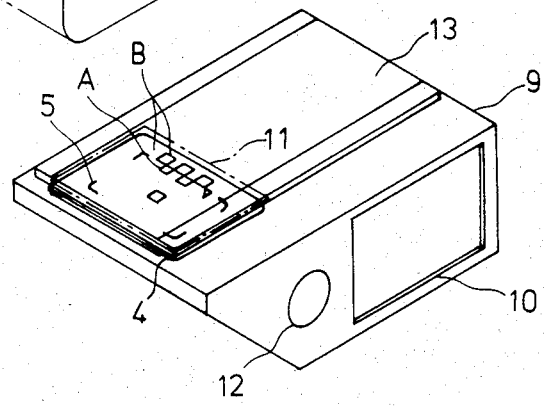
FIG. 3 is a perspective view showing a housing of the illuminated finder of an embodiment of the present invention.

FIG. 2 is the perspective view showing the inside structure of the illuminated finder of the embodiment of the present invention. FIG. 3 is the perspective view showing the housing of the illuminated finder of the embodiment of the present invention.

Figure 1:
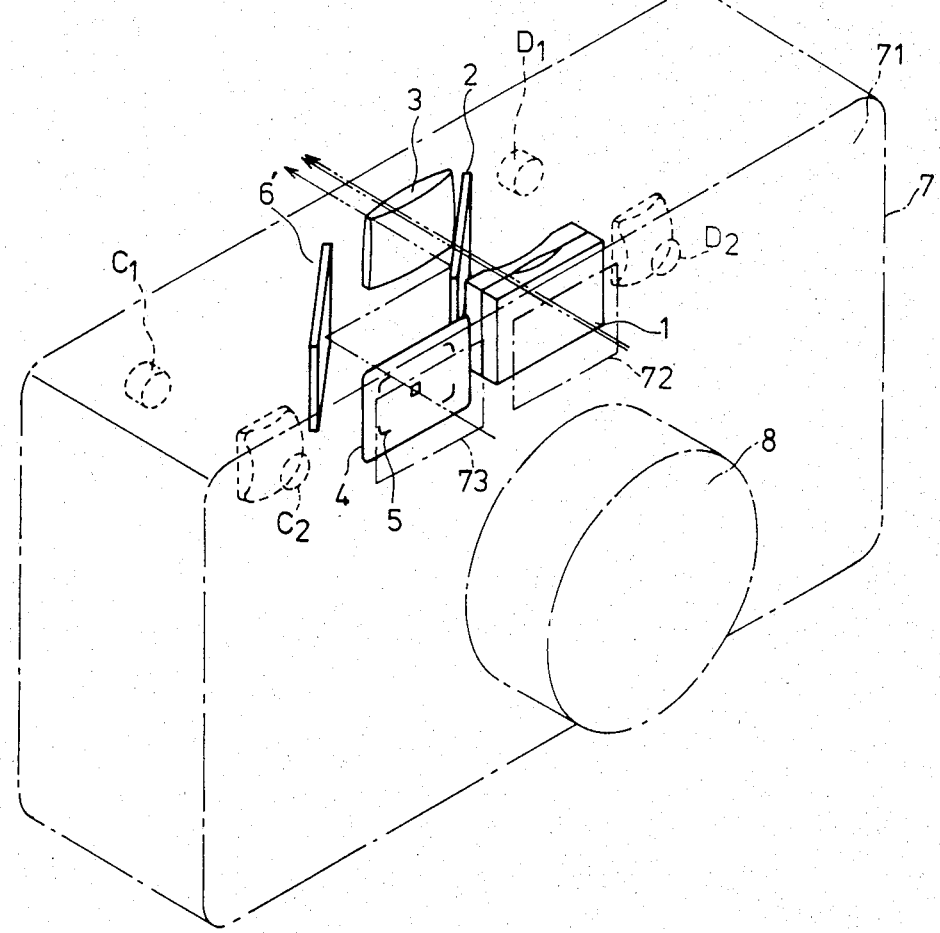
FIG. 1 is a perspective view showing the conventional illuminated finder.

In FIG. 2 and FIG. 3, the parts corresponding to those of FIG. 1 are designated by the same numbers as in FIG. 1.

An illuminated finder has in a case 9 an object lens 1, a half reflection mirror 2, an eye lens 3, a frame sheet 4 having a transparent view frame 5 and a reflection mirror 6 operatively arranged.

The illuminated finder comprises in a case 9 a first window 10 through which the light enters inside the finder space from the object. The first window 10 is disposed at the front surface of a camera, to which the lens 8 is mounted. The illuminated finder further comprises a second illuminating window 11 through which toplight enters inside the finder space. The toplight is defined in this invention as a light coming from upper direction with respect to the camera. The second window, therefore is disposed at the upper face of the camera on which a shutter button or release button is provided. Further the illuminated finder comprises a distance measuring window 12 which is used for forming an optical path for the triangulation method and so on as shown in FIG. 2 and FIG. 3.

Therefore, in such illuminated finder, the image of the object can be looked at with the light from the object. The light is entered through the first window 10 and led to a man's eye through a first optical system comprising the first window 10, the object lens 1, the half reflection mirror 2 and the eye lens 3. And the view frame 5 can be looked at with the toplight from the upper direction and led to a man's eye through a second optical system comprising the second window 11, the reflection mirror 6, the half reflection mirror 2 and the eye lens 3. In a modified species, the reflection mirror 6 can be unified with the half mirror 2.

Accordingly, even in the indoor photographing in which the first window 10 can not receive sufficient light, the view frame 5 of the illuminated finder of the present invention is easy to be looked at, since ceiling light source or the like, for example, a fluorescent lamps generally can supply sufficient light to the second window 11 which is disposed on the upper face of the camera.

Furthermore, besides that the second window 11 through which the light enters inside the camera is disposed on the upper surface of the camera as above-mentioned, the information indicator 13 is disposed on the same upper surface of the camera. Therefore, it is easy to look at the the photographing information from the outside and also through the eye lens 3.

That is, as shown in the embodiment of FIG. 3, the information indicator 13 may be disposed on the upper part of the finder case 9 and a part of the information indicator 13 is mounted on the illuminating window 11. When such configuration is selected, it is unnecessary to use plural information indicators. In other words, it is unnecessary to assemble another information indicator 13 at the inside of the camera as hitherto. That is, in the present invention on the second window 11 only one information indicator suffices for both looking at through the eye lens and looking at from outside face of the camera. And the information indicator 13 can be assembled at the upper surface of the camera, or as separate or detachable apparatus. Accordingly, various kinds of photographing informations, for example, photographic sensitivity, frame number etc. can be indicated thereon.

In the embodiment of the FIG. 3, a part of the information indicator 13 covers the whole part of the second illuminating window 11, and an information indicated by the part of the information indicator 13, can be looked at through the eye lens 3 via reflection on the reflection mirror 6 and so on. But such an embodiment that at least a part of the information indicator 13 covers at least a part of the second illuminating windows 11, has the same advantages as the embodiment of FIG. 3. Therefore, such embodiment does not deviate from the patent claim.

In such an embodiment that the information indicator 13 and the second window 11 are combined, a liquid crystal display device can be used as the information indicator 13. And in that case, a group of marks A for displaying distance information, etc., can be made on the frame sheet 4 same as the view frame 5. On the other hand, a group of pattern B is formed in the liquid crystal display device mounted on the second window 11, as a shutter which controls passing of the light through the second window 11. The group of pattern B of course can be eliminated. Therefore, it is possible to selectively conduct a necessary mark A on the frame sheet 4 for looking at to the eye lens 3 by controlling the state of the pattern B. Thus, it can be easily imagined that the electrical-optical characteristic of the liquid crystal can be utilized effectively.

Furthermore, the illuminated finder of the present invention comprises a distance measuring window 12 belonging to a third optical system on the finder case 9. And the distance measuring window 12 can be disposed very closely to the first illuminating window 10. That is, the third optical path of the third optical system can be disposed to cross the second optical pass formed by the light entering inside from the upper second illuminating window 11. That is, the distance detectors E, F which form the distance detection optical system can be disposed closely each other, irrespective of that they are active type or passive type, as shown by broken lines in FIG. 2.

Accordingly, the illuminated finder of the present invention can be constructed very much compact than the conventional illuminated finder. That is, the second optical path for looking at the view frame and the third optical path for executing the triangulation method are disposed to cross each other.

Accordingly, the inside space of the camera, which is used for assembling the parts of the illuminated finder can be utilized usefully. Thus, the two distance detectors E, F can be disposed in the camera without putting the two windows in one line between the two distance detectors E, F themselves, thereby enabling to reduce overall width of the camera.

What is claimed is:

1. An illuminated finder comprises:
   (1) a first optical system for looking at an image of an object, comprising:
      a first window for taking in a first light from a direction of said object,
      a finder object lens for leading said first light inside a camera body through said first window,
      an eye lens disposed on a rear part of a camera and
      a half reflection mirror disposed in a first light path between said finder objective lens and said eye lens,
   (2) a second optical system which comprising:
      a second window through which top light as a second light is taken inside said camera body,
      a frame sheet having a view frame, through which said second light passes, said second light entering inside said camera body through said second window, and
      a reflection mirror for leading said second light incident through said frame sheet to said eye lens in a second light path via said half reflection mirror,
      whereby said second optical system making said view frame overlapping on said image of said object at said half reflection mirror, and
   (3) a photographing information indicator disposed on said second window at least a part of which covers at least a part of said second window.

2. An illuminated finder comprises:
   (1) a first optical system for looking at an image of an object, comprising:
      a first window for taking in a first light from a direction of said object,
      a finder object lens for leading said first light inside a camera body through said first window,
      an eye lens disposed on a rear part of a camera and
      a half reflection mirror disposed in a first light path between said finder objective lens and said eye lens,
   (2) a second optical system which comprising:
      a second window through which top light as a second light is taken inside said camera body,
      a frame sheet having a view frame, through which said second light passes, said second light entering inside said camera body through said second window, and
      a reflection mirror for leading said second light incident through said frame sheet to said eye lens in a second light path via said half reflection mirror,
      whereby said second optical system making said view frame overlapping on said image of said object at said half reflection mirror,
   (3) a photographing information indicator disposed on said second window at least a part of which covers at least a part of said second window, and
   (4) a distance measuring window through which a third light from said object is incident the finder,
      a distance measuring optical path means for passing said third light,
      said distance measuring optical path means and said second optical path being arranged in such a manner that said second light of said second optical path and said third light of said distance measuring optical path means crossing each other in said illuminated finder.

3. An illuminated finder in accordance with claim 1 or 2,
   said photographing information indicator is a liquid crystal display device.

* * * * *